Jan. 15, 1935. J. B. RICE Re. 19,427

ORNAMENTAL TOP FOR CIGARETTE TINS

Original Filed Oct. 20, 1933

INVENTOR
Jacques B. Rice
BY N. H. Lockwood
ATTORNEY

Reissued Jan. 15, 1935 Re. 19,427

UNITED STATES PATENT OFFICE 19,427

ORNAMENTAL TOP FOR CIGARETTE TINS

Jacques B. Rice, New York, N. Y., assignor to Bernard Rice's Sons Incorporated, a corporation of New York Original No. 1,965,086, dated July 3, 1934, Serial No. 694,374, October 20, 1933. Application for reissue November 8, 1934, Serial No. 752,108

9 Claims. (Cl. 41—34)

This improvement relates more particularly to an ornamental top which may be removably attached to the hinged lid of the usual cigarette tins or cartons of 50 cigarettes.

Practically all of the standard brands of cigarettes in addition to the usual package are put up in packages of 50 which are packed in flat tins or cardboard boxes, the tins or boxes being substantially the same size for all brands. These cigarette tins, boxes or cartons are usually highly decorated but are not particularly attractive or ornamental and, therefore, the object of the present improvement is to provide an ornamental top which may be readily slipped over the lid of a cigarette tin or carton of 50 so that the package becomes an ornamental container for the cigarettes. In this way a cigarette tin becomes attractively ornamental and may be displayed upon the table or dresser in the home or at the club.

A further object is to simplify the construction of the ornamental top, particularly by utilizing a continuous depending flange, with the sides slightly bowed inward so as to frictionally engage the depending flange of the lid of the tin. By this means, the ornamental top may be readily attached to or removed from one tin or carton and placed upon another without presenting any mechanical difficulties.

In order that in manufacture the ornamentation of the tops may be varied, it is preferable to provide a rectangular frame comprising the continuous depending flange for engaging the lid of the tin and an angular portion extending inward over the top of the lid, a rectangular ornamental metal plate being mounted in the frame and secured to the angular portion thereof in any suitable manner. This plate is preferably covered by a suitable layer or sheet of ornamental or protective material.

Obviously, this construction lends itself to a variety of ornamental effects which may be obtained by various ornamentations on the plate itself or on the layer or sheet of material covering the plate.

As an important feature of ornamentation, it is preferable to fasten to the outer face of the plate an ornamental escutcheon which may be of any suitable shape or material and may be attached directly to the plate or over the sheet of protecting material according to the ornamental effect that it is required to produce.

Figure 1:
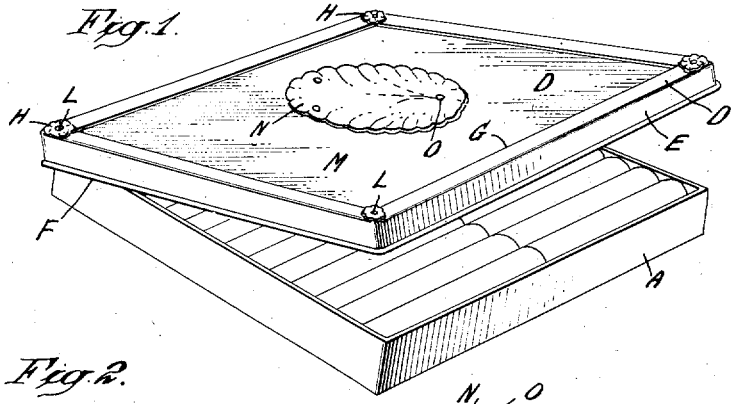
Figure 2:
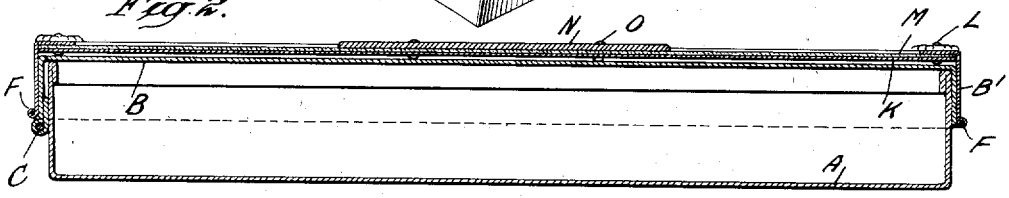
Figure 3:
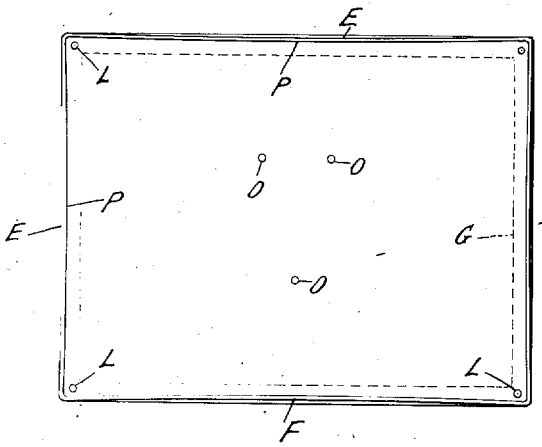
Figure 4:
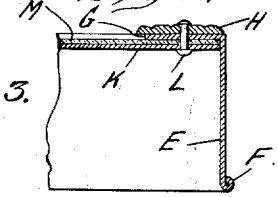
Figure 5:
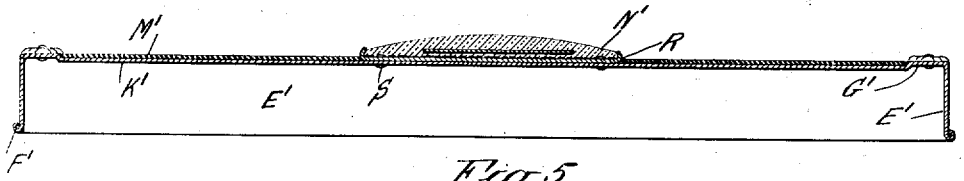

Preferred forms of the improved ornamental top are shown in the accompanying drawing in which Fig. 1 is a perspective view of one form of the ornamental top, attached to the lid of a cigarette tin; Fig. 2 is a sectional view of the ornamental top shown in Fig. 1, with the cigarette tin also shown in section; Fig. 3 is a view showing the underside of the ornamental top of Fig. 1 illustrating the bowed sides; Fig. 4 is an enlarged broken away section of one corner of the top shown in Figs. 1 and 2 and Fig. 5 is a transverse section of a modified construction of the ornamental top.

Referring to the drawing, the usual form of cigarette tin A is provided with the usual flanged lid B, which, in the form illustrated, is hinged to the body of the box at C, substantially as indicated in Fig. 2. The ornamental top of the present improvement as shown in Figs. 1 and 2 of the drawing comprises a rectangular frame D preferably formed of an angular metal strip bent square at the corners and soldered, the frame thus being provided with a depending flange portion E which may or may not have a back fold or turned over edge F, according to the ornamental effect desired. Integral with the depending flange E there is an inwardly extending angular portion G extending substantially at right angles to the flange portion E.

The rectangular frame D just described as formed from a continuous angle piece bent at the corners may be stamped or drawn into the shape required or substantially as indicated in Figs. 1 to 3.

In the form shown ornamental rosettes or corners H are preferably attached to the corners of the frame D to cover the joints between the angular portions G, and add to the ornamental effect.

To complete the ornamental top, the flanged frame D is then attached to a square cornered plate K (see Figs. 3 and 4) by solder or other suitable means, but preferably by rivets L passing through the rosette corners, as indicated in Figs. 1 and 4. The ornamental plate may be secured by solder directly to the frame D when the sheet of covering material, as hereinafter described, is not first applied.

The ornamental plate K to which the flanged frame D is attached may be ornamented by stamping, engraving or otherwise impressing thereon any desired ornamental design and then covering the same with lacquer or preferably with a transparent or ornamental sheet of material M, through which the rivets L for securing the plate K pass as shown in Fig. 4.

Obviously, the ornamental or protecting sheet of material M should be transparent if it is desired to display a design carried by the supporting plate K. For this purpose the covering and protecting layer or sheet M may consist of any of the well known cellulose compounds now on the market or other thin sheet material of this character and may be crystal clear or of any color desired. It will be understood also that the plate K carrying the ornamental design may be of any color desired.

Furthermore, it may be preferable, to obtain a particular ornamental effect, to have the ornamental design carried by the sheet of covering material M, which in any case is supported by the plate K, as described above and shown in Figs. 1 to 4.

The covering and protecting sheet of material M may be cemented to the plate K, but whether cemented or not, it is preferable to attach to the plate over the covering sheet M an escutcheon N which may be of filigree design or of any suitable ornamental construction or arrangement, the ornament or escutcheon being preferably riveted to the plate K by suitable rivets O, as indicated.

In order to facilitate attachment of the ornamental top by frictional engagement with the depending flange B′, of the lid, the depending flange side portion E of the ornamental top D is preferably bowed inward at P a small amount, substantially as shown in Fig. 3, so that the top will cling to the lid of the cigarette tin by frictional engagement with the flange thereof. Any similar device may be utilized to accomplish the same result.

In a modified form shown in Fig. 5, the entire ornamental top is indicated as stamped or drawn with a continuous depending flange E′, integral with the frame-like angle portion G′ and the rectangular top plate K′ which preferably is depressed and may be coated or covered with an attached layer of ornamental material M′ substantially as shown in Fig. 5. In this form, the covering of the plate portion of the top may be of enamel and the ornamental escutcheons or the like N′ may be mounted in a holder R which in turn is secured to the top plate K′ by rivets S or otherwise as may be preferred.

It will be understood that when it is desired to vary the ornamental appearance of the flange portion of the top, the turned back or rolled edge F may be eliminated, leaving a plain edge, and such an edge may be either flaring or straight according to the effect desired.

It has been pointed out that the border or frame portion D of the ornamental top, as shown in Figs. 1 and 2, may be drawn or formed as a continuous seamless piece, but at the present time it has been found preferable, as a matter of cost and the saving of material, to make this frame of an angle strip bent to form the rectangular frame, and then solder the ends and corners.

Obviously, an endless variety of designs may be impressed upon the plate K forming the central portion of the ornamental top and surrounded by the frame-like border portion D; and likewise a great variety of materials of various colors and designs may be used for the covering sheet M; and the ornamental escutcheons may be of any suitable design or color and these and the various designs may be arranged in any suitable manner to obtain the desired ornamental effect.

It will be understood, therefore, that while the forms shown represent what are now considered preferred forms, various modifications and rearrangements of the designs and of the method of construction may be made without departing from the spirit and scope of the invention.

I claim:—

1. An ornamental top for concealing matter indicating the contents of a carton arranged to be attached to the lid of the carton during removal of the contents, comprising a continuous rectangular plate, a layer of ornamental material mounted upon and secured to the outer face of said plate, and means extending along the edges of said plate for attaching it to and temporarily holding said ornamental top on the lid of the carton.

2. An ornamental top for concealing matter indicating the contents of a carton arranged to be attached to the lid of the carton during removal of the contents, comprising a continuous rectangular plate, a layer of ornamental material mounted upon and secured to the outer face of said plate, a covering of transparent material over said ornamental layer and means extending along the edges of said plate for attaching it to and temporarily holding said ornamental top on the lid of the carton.

3. An ornamental top for concealing matter indicating the contents of a carton arranged to be attached to the lid of the carton during removal of the contents, comprising a continuous rectangular plate, a layer of ornamental material mounted upon and secured to the outer face of said plate, a layer of thin transparent material covering said ornamental material, means for holding said transparent layer in close contact with the ornamental layer and means comprising depending flanges along the edges of said plate for attaching it to and temporarily holding said ornamental top on the lid of the carton.

4. An ornamental top for concealing matter indicating the contents of a carton arranged to be attached to the lid of the carton during removal of the contents, comprising a continuous rectangular plate, a layer of ornamental material mounted upon and secured to the outer face of said plate, a layer of thin transparent material covering said ornamental material, a peripheral flange member secured to the edges of said plate and overlying said transparent layer and means on said flange member for attaching it to and temporarily holding said ornamental top on the lid of the carton.

5. An ornamental top for concealing matter indicating the contents of a carton arranged to be attached to the lid of the carton during removal of the contents, comprising a continuous rectangular metal plate, a layer of ornamental material implanted on the outer face of said plate, a layer of transparent material overlying said ornamental layer, an angular frame secured to said plate along the peripheral edges thereof and having flanges depending below said plate and means associated with said flanges for cooperative engagement with the lid of the carton for temporarily attaching said ornamental top thereto.

6. An ornamental top for temporary attachment to the lid of a carton of cigarettes while the contents are being removed, comprising a top member formed of a metal plate suitably ornamented and means carried by said plate for attaching said ornamental top to the lid of the carton.

7. An ornamental top for temporary attachment to the lid of a carton of cigarettes while the contents are being removed, comprising a top member carrying an ornamental design, and resilient members extending from said top member for engaging the side walls of the lid of the carton, said resilient members being arranged to act independently of each other in the attachment of the ornamental top to the lid of the carton.

8. An ornamental top for temporary attachment to the lid of a carton of cigarettes while the contents are being removed, comprising an ornamental top member formed of a metal plate, and means depending from the edge of said plate to engage the depending flange of the lid of the carton for attaching the ornamental top thereto.

9. An ornamental top for temporary attachment to the lid of a carton of cigarettes while the contents are being removed, comprising a top member carrying an ornamental design, and means extending from said top member for engaging the side walls of the lid of the carton for attaching the ornamental top thereto.

JACQUES B. RICE.